Inventors
Wilhelm A. Vahs
Werner Noissinger
By Watson, Cole, Grindle & Watson
Attys.

Inventors
Wilhelm A. Vahs
Werner Noissinger
By
Watson, Cole, Grindle & Watson Attys.

Inventors
Wilhelm A. Vahs
Werner Noissinger
By
Watson, Cole, Grindle & Watson
Attys.

Feb. 11, 1969 W. A. VAHS ET AL 3,427,632

LEVEL RECORDER HAVING TAPE PUNCHING MEANS

Filed Nov. 1, 1966

Sheet 4 of 4

Inventors
Wilhelm A. Vahs
Werner Noissinger
By Watson, Cole, Grindle & Watson
Attys.

3,427,632
Patented Feb. 11, 1969

3,427,632

LEVEL RECORDER HAVING TAPE PUNCHING MEANS

Wilhelm A. Vahs and Werner Noissinger, Kempten, Allgau, Germany, assignors to A. Ott G.m.b.H., Kempten, Allgau, Germany Filed Nov. 1, 1966, Ser. No. 591,271
Claims priority, application Germany, Nov. 3, 1965, O 11,232
U.S. Cl. 346—72 13 Claims
Int. Cl. G01d 9/00, 15/04; G01f 3/00

ABSTRACT OF THE DISCLOSURE

A device for recording levels having an analogue level sensing means together with an analogue digital converter responsive to analogue values and means for punching a tape and timing means for operating the punching means.

The invention relates to level recording devices, and more particularly though not exclusively to devices for continuously recording the water level of rivers, canals, artificial reservoirs, and also the level of ground water. Such devices can also serve for the automatic calculation of the mean condition of the water and its rate of flow. However the invention can also be applied to other instruments such as rain recording gages, barometers, anemometers, and all other purposes in which it is useful to sense a level using an analogue sensing element, to convert the analogue values so obtained in digital values and to store them before transmission or processing.

In the prior art the recording of water levels over a period of time for the purpose of determining a mean level which could be used for finding the mean flow by the use of a flow curve, was generally carried out using a drum-type level recorder or other device driven by the changes in level. The evaluation of such a chart or recording made on a drum is comparatively tedious and time-consuming. Although a proposal has already been made for the evaluation of such charts by means of electronic sensing or reading devices coupled with means for storing the ordinate values in the form of impulses, such a method is, again, extremely tedious owing to the further calculations and integration necessary for determining the mean level and the flow. Similar difficulties also result in the evaluation of analogue data obtained with such recording devices with means for giving level values.

One aim of the present invention is to provide a recording device free from the disadvantages of the prior art devices.

A further object of the present invention is to provide a recording device, more especially for recording water levels, which quickly and accurately automatically records and converts the analogue values sensed and provides for the derivation of average values, flow values, etc., and, possibly, makes possible a storage and transmission of the data obtained.

The invention consists in a device for recording levels comprising, analogue level sensing means (such as a float), an analogue-digital converter, responsive to the analogue values sensed, means for punching tape so as to represent the digital values in five channel teleprinter code, and timing means for operating the tape punching means at predetermined time intervals. The advantage of this arrangement is that the digital data or values recorded in the form of the punched tape can be printed out by means of a normal teleprinter or can be transmitted over a standard teleprinter network. Perhaps the most important advantage is however that such tape printed using the five channel teleprinter code can be used directly for processing in computers, which, when suitably programmed, can provide the required final data or values such as the mean level or mean flow. The use of special electronic or other data converting devices is not required, the evaluation of the data is accelerated, and sources of error are largely removed.

In accordance with a further feature of the invention the analogue-digital converter can be in the form of a reversible counter of the type using reversible rotary registers each of which carries a regular ten-sided disk having code recesses and projections sensed by suitable means. By a "reversible" counter, we mean one capable of adding and subtracting from a total in accordance with signals received. The rotary registers can, if required, also be arranged to embody the coding disks as well, that is to say each coding disk and register are in the form of an integral unit. Preferably a four-figure counter with four corresponding disks is used.

Such a counter with ten-sided coding disks and registers rotating in accordance with the analogue values for the water or other level converts the analogue values or data directly into digital values which are then recorded by punching the tape.

In a preferred embodiment of the invention, for this purpose, the coding disks on the registers cooperate with a punching means having tape punches which are moved at predetermined intervals towards the coding faces, that is to say towards the recesses and projections of the coding disks, the latter being held in positions corresponding to a level value during tape punching and are thus temporarily non-responsive to the level sensing means. The teleprinter tape to be perforated can conveniently be passed through a slot in a guide plate which is moved towards the punches to drive them against the coding disks and thus punch the tape in accordance with the value recorded by the registers. The drive of this punching device can be by cams or the like driven by a motor which is switched on and off at predetermined intervals by the timing means. The coding and punching devices are conveniently made as a unit which carries out the conversion of the analogue data into digital data and simultaneously perforates the tape with five channel ITT code. The analogue-digital converter is set by means of the float or other sensing means which for this purpose drives the first register, with its coding disk, which in turn drives further registers and coding disks. An additional counter with numbers on its registers for direct viewing can conveniently be provided and be driven by gearing transmitting the data as to levels. At preset time-intervals, for instance every quarter of an hour, the timing means gives an electrical control impulse to the electric motor, supplied for instance from a battery, and the motor drives, via a step-down gearing, the punching device and a transport means for the tape. During the punching operating the motor operates a locking device which makes the coding device non-responsive to changes in level value. As soon as the locking device is in operation, the punches are actuated and the tape, which has been suitably transported, is perforated in accordance with the code reading established on the code disks. The punches are then retracted from the tape and the motor is switched off until the next punching operation is to take place.

The recording device in accordance with the invention, and more particularly its coding and punching unit, forms a compact assembly which can be constructed in an extremely small space taking up little room in a water level recording station. The device with its various components, that is to say, a wheel driven by the float (or other means for transmitting the level values), the timing means, the supply and take-up spools for the tape, the source of current, and other parts can all be included in a common housing. The device can work for long periods of time automatically and without special supervision, for instance for six months, the tape being perforated every quarter of an hour.

In addition to the essential features of the embodiments of the invention described above, the invention can also include the following distinctive features to be described with reference to the attached drawings. It is clear that the invention is not limited to the embodiment described and shown but includes all other embodiments, of which the water level recorder described is preferred.

Figure 1:
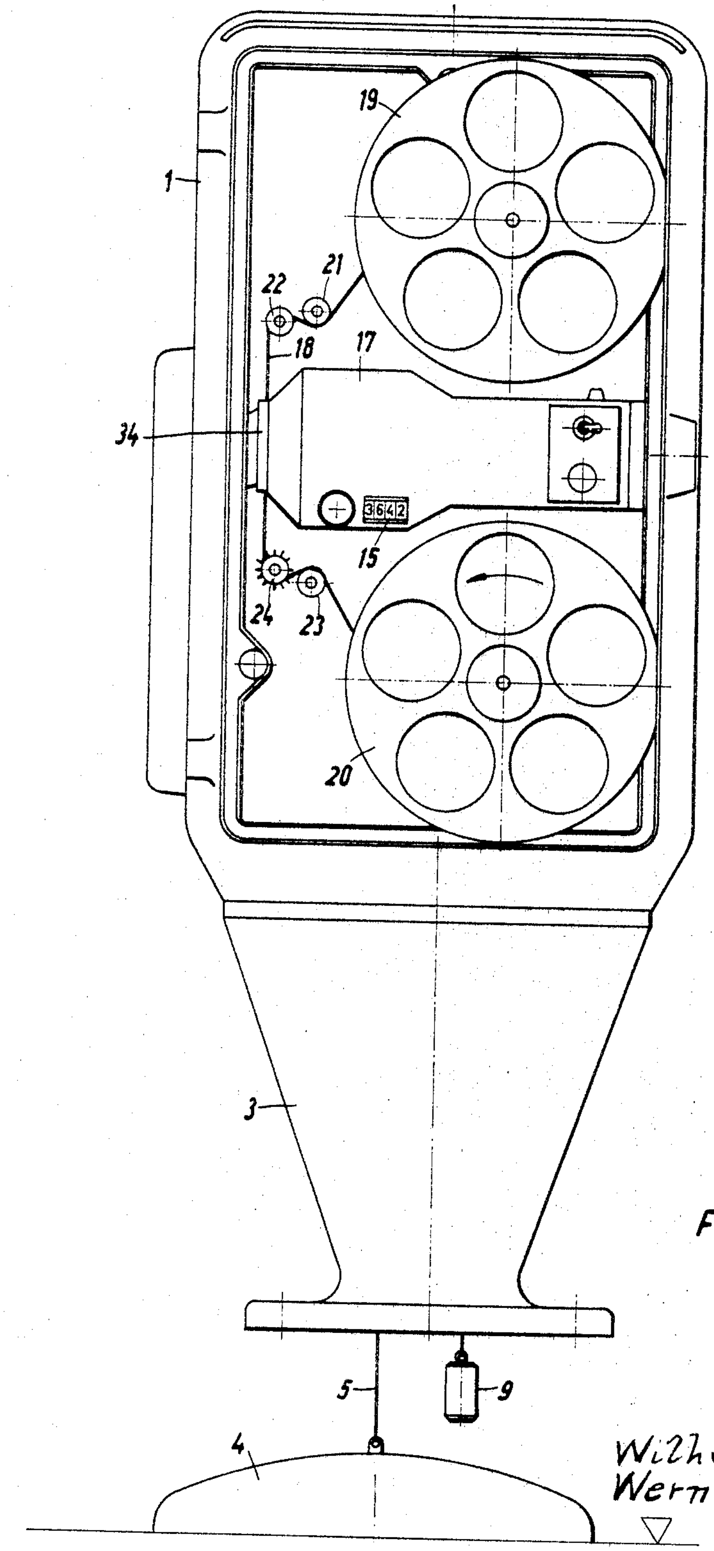
FIG. 1 is a front view of level recording device in accordance with the invention.
Figure 2:
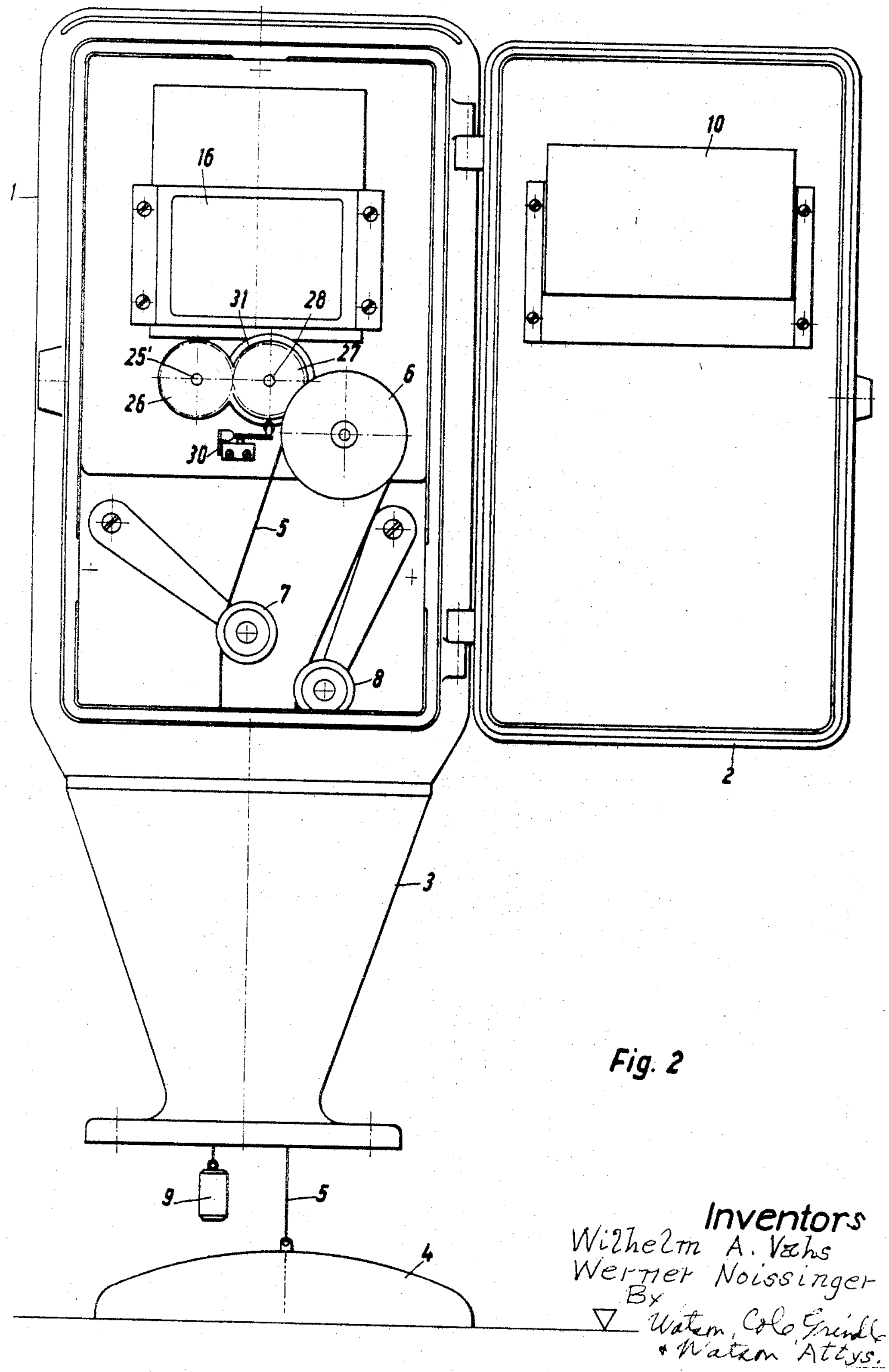
FIG. 2 is a view from the rear with the cover opened.

The parts of the device are accommodated in housing 1 which is provided with a rear cover or door 2 and is carried, for example, on a frame 3 above the level of the water to be measured.

The sensing of the water level is carried out by conventional means including a float 4 suspended at the end of float cord 5 passing through the frame 3 into the housing 1 where it passes over float wheel 6 and guide wheels 7 and 8. The other end of the float cord 5 is fixed to a counter weight 9. The cover or door 2 carries a battery 10, of, for example, 7.5 v.

Figure 5:
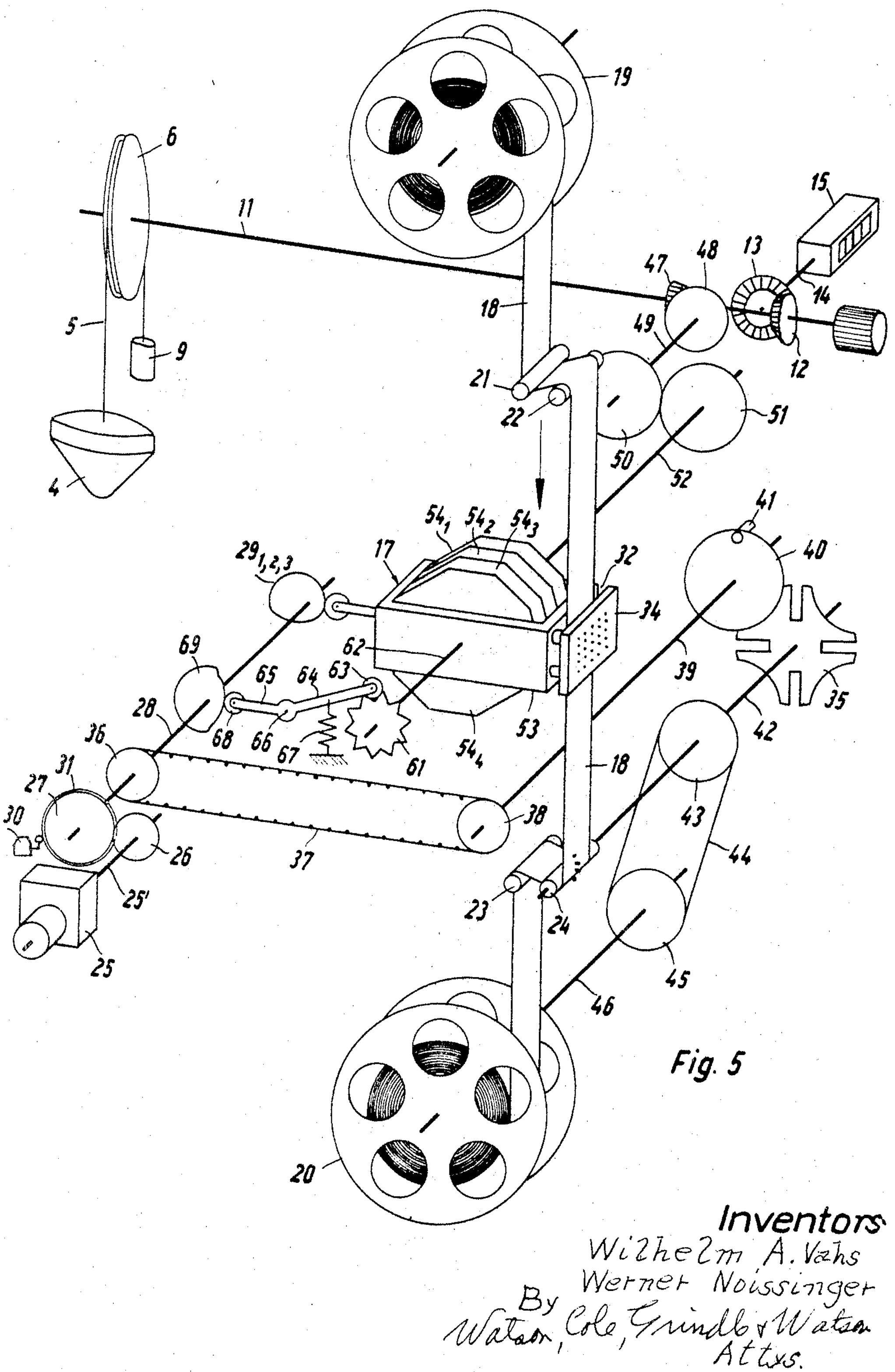
FIG. 5 is a diagrammatic perspective view of the whole of the mechanism of the punched-tape level recording device.

As can be seen from the diagram of FIG. 5, the float wheel 6 is carried on a shaft 11 which drives a shaft 14 via bevel gearing 12, 13. A visual indicating means in the form of counter 15 is driven by the shaft 14. The housing 1 also accommodates a timing means 16 and coding and punching unit, to be described below, indicated by the general reference numeral 17.

The paper tape 18 to be punched has the dimensions of a normal teleprinter tape to be punched with the 5 channel ITT code. The tape is supplied from the spool 19 mounted in the housing 1 and is taken up by a spool 20. The tape 18 passes over guide rollers 21, 22, and 23 and a transport roller 24 with projections fitting into holes in the tape.

The drive for the coding and punching unit 17 is in the form of an electric motor 25 as shown in FIG. 5. Via gear wheels 26 and 27, the motor 25 drives a drive shaft 28 carrying three actuating cams 29, though a different number could be used. The housing 1 also holds a microswitch or the like 30 for switching the motor 25 on and off in accordance with the operation of the timing means 16. The contact of the micro-switch 30 is controlled by a disk 31 connected with a gear wheel 27.

At one end of the coding and punching unit 17 the paper tape runs through a slot 32 in a guide plate 33 fixed behind a perforated plate 34.

The transport of the tape 18 is carried out stepwise by Geneva mechanism including a slotted wheel 35, as shown in FIG. 5. The drive shaft 28 drives a shaft 39 via gear wheel 36, a tooth belt 37, and a further wheel 38. The shaft 39 drives a wheel 40 with a pin 41 forming part of the Geneva mechanism and driving the wheel 35 stepwise. A pulley 43 is mounted on the shaft and serves to drive a roller 45 via a belt 44 so as to rotate the take-up spool 20 on the shaft 46. In this manner rotation of the shaft 46 keeps the tape constantly under tension.

The coding part of the coding and punching unit 17 is driven by the float wheel shaft 11 whose motion is transmitted by bevel gears 46–48, a shaft 49, and further gear wheels 50 and 51. The coding part of the unit comprises a conventional four-figure reversible counting device using rotary registers mounted on a shaft 52 in the frame 53.

The four rotary registers of the counter carry coding disks $\mathbf{54_1}$, $\mathbf{54_2}$, $\mathbf{54_3}$, and $\mathbf{54_4}$, preferably held on the registers by adhesive, whose edges are provided with recesses 55 and projections 56 representing the teleprinter code. In the diagram of FIG. 5 the shaft 52 is shown, to simplify the drawing, as a connecting shaft between the gear 51 and the first coding disk $\mathbf{54_1}$; but in the actual arrangement as shown FIGS. 3 and 4 the gear wheel 51 is not placed outside the frame 53 as shown in FIG. 5 but is placed inside and is attached to the first coding disk $\mathbf{54_1}$, that is to say the disk with the lowest denomination. The remaining disks $\mathbf{54_2}$, $\mathbf{54_3}$, and $\mathbf{54_4}$ are journalled on the shaft 52 just as the coding disk $\mathbf{54_1}$ and the gear wheel 51 are journalled on it and are entrained by the usual means employed in register counters. As shown in FIG. 4, two outer identical cams $\mathbf{29_2}$ and $\mathbf{29_1}$ are fixed on the drive shaft 28 on each side of an offset central cam $\mathbf{29_3}$. The cams $\mathbf{29_1}$ and $\mathbf{29_2}$ act on rollers 57 and 58 to move a plate 59 against the action of tension springs 60 so that the plate moves towards the opposite end of the frame 53 and moves against the edges of the coding disks $\mathbf{54_{2-4}}$ in order to ensure that they are aligned and not offset in relation to each other. The coding disk $\mathbf{54_1}$ is brought into correct alignment by a locking device which, as can be seen from FIG. 5, consists of a wheel 61 with pointed stub teeth and is mounted on a shaft 62 rotating with the first coding disk $\mathbf{54_1}$. The wheel 61 cooperates with a roller pawl 63–64 forming part of a double-armed lever 64 and 65. The lever pivots about an axis 66 and is loaded by a spring 67 which pulls the roller 63 into gaps between the teeth of the wheel 61. The lever part 65 carries a follower roller 68 which cooperates with a cam disk 69 fixed on the shaft 28. The disk 69 is so constructed as to align the first coding disk $\mathbf{54_1}$ at the beginning of a working cycle and simultaneously lock the drive device for the coding disks and the counter 15 as well as the float wheel 6; that is to say it renders the coding disks and registers non-responsive to changes in the position of the float. This is to prevent any movement of float from causing a displacement of the coding disks which would cause incorrect punching of the paper tape.

Figure 3:
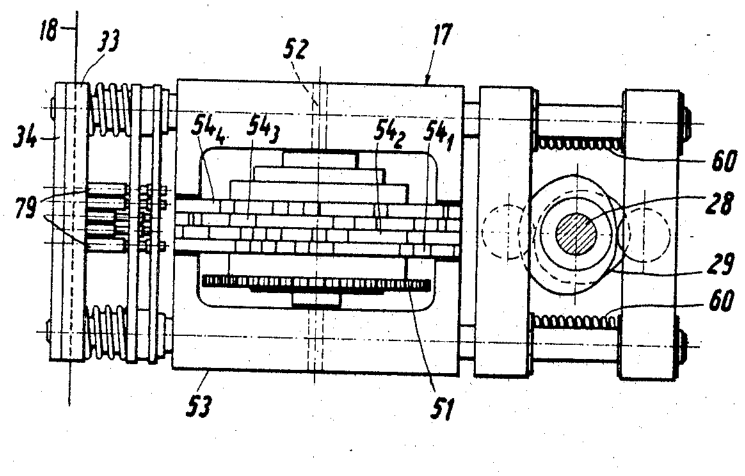
FIG. 3 is a plan view of coding and punching unit removed from the rest of the device.
Figure 4:
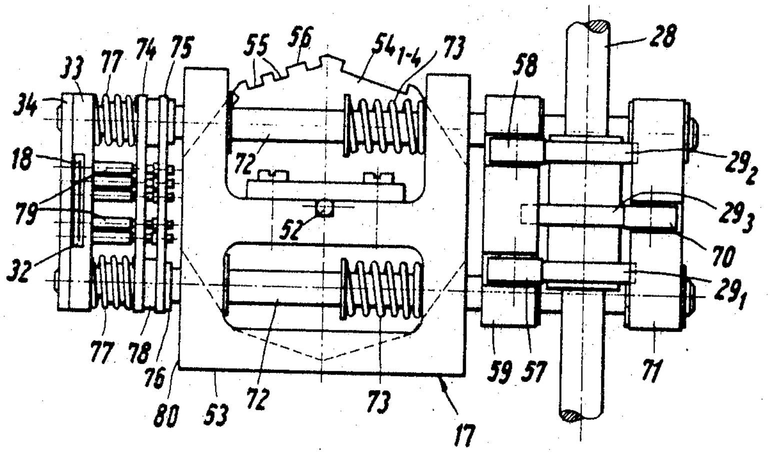
FIG. 4 shows the coding and punching means from the front side of the device.

After all four coding disks $\mathbf{54_{1-4}}$ have been aligned in the correct position, the middle cam $\mathbf{29_3}$ of the punching mechanism comes into operation and presses, via a roller 70, the plate 71 to the right (in terms of FIGS. 3 and 4). The plate 71 is mounted on four pulling rods 72 loaded by compression springs 73. On their other ends the rods 72 are fixed to the plates 33 and 34. Two plates 74 and 75 are arranged to slide on the rods 72 and are pressed by compression springs 67 against abutment collars 76 on the rods 72. The plates 74 and 75 are spaced apart by rings 78.

Between the plate 33 and plates 74, 75, the punches 79 are arranged so that they can move along their axes. When the rods 72 are pulled by cam $\mathbf{29_3}$ acting on the plate 71 against the action of the spring 73, all the plates 33, 34 74, 75 are drawn towards the coding disks. At first the plate 75 comes to rest against the end face 80 of the frame 53 and on continued movement of the rods 72 the plates 33, 34 are moved further towards the end face 80 against the action of the springs 77. This leads to the pressing of the punches 79 against the adjacent edges of the coding disks $\mathbf{54_{1-4}}$; those punches which come up against projections 56 being arrested while the others move further into the recesses 55. On further movement of the guide plate 33 the punches pass into the slot 32 of the plate 33 and perforate the paper tape 18 in accordance with code reading which has been set up on the code disks, the reading being represented by the arrangement of the recesses 55 and projections 56 on the four adjacent edges of the coding disks.

On further rotation of the drive shaft 28 the rods 72 return to their original position and the punches are drawn out of the guide plate 33. Also the aligning plate 59 returns back into its original position. After the completion of the perforating operation, the cam disk 69 causes the locking roller 63 to come out of engagement with the teeth of the wheel 61 so that the transmission means connected with the float is freed. After this the drive motor 28 is switched off by the switching disk 31 and the micro-switch 30. The coding and punching unit is thus ready for a further perforating operating after a time interval as set by the timing means, for example ¼ hour.

During the ¼ hour interval any movements of the float are automatically transmitted to the counter 15 and the code discs $54_{1-4}$.

What we claim is:

1. A device for recording levels, comprising analogue level sensing means, an analogue-digital converter responsive to analogue values corresponding to the levels sensed, means for punching a tape in accordance with normal 5 channel teleprinter code to represent digital values from the converter, timing means for operating the punching means at predetermined time intervals, the analogue-digital converter comprising a counter of the type using reversible registers, the device also comprising regular ten-sided coding disks having recesses and projections, said disks being mounted on the registers, means responsive to the recesses and projections on the disks, the registers being adapted for four-figure operation there being four consecutive coding disks, the tape punches being arranged for cooperation with the coding disks, the punches forming part of the punching means, means for driving the punches against the recesses and projections on the disks in response to signals from the timing means, means for rendering the coding disks temporarily nonresponsive to changes in the value of the level during the tape punching, a guide plate with a guide slot for the tape to be punched, means for moving the plate towards the punches, a drive shaft, cam means arranged on the drive shaft, the cam means being arranged to move the guide plate with tape towards the punches and consequently to move the punches against the recesses and projections of the coding disks.

2. A device according to claim 1 comprising a motor, arranged to be swtiched on and off by the timing means at preset intervals, for causing rotation of the drive shaft.

3. A device according to claim 1 comprising a shaft on which the registers and code disks are mounted, disk aligning means for aligning the disks, and means for operating the aligning means before each tape puching operation.

4. A device according to claim 3 comprising a plate means arranged to be moved by the cam means, a frame in which the registers and coding disks are mounted between, on the one hand, the cam means on its shaft. and the plate means, and on the other, the punches and tape guide plate, the device further comprising pull rods connecting the guide plate and the plate means.

5. A device according to claim 3 in which the aligning means comprises a moving plate and spring means, the moving plate being arranged to be driven by the cam means and by the spring means so as to press against the sides of the coding disks.

6. A device according to claim 3 comprising means driven by the drive shaft to align and lock the coding disk having the lowest denomination before tape punching takes place.

7. A device according to claim 6 in which the locking means comprises a wheel, with pointed stub teeth, connected with the lowest denomination code disk, the device further comprising a roller pawl to be forced in between the stub teeth by the drive shaft.

8. A device for recording levels, especially hydrometric levels, comprising analogue level sensing means, an analogue-digital converter responsive to analogue values corresponding to the levels sensed, means for punching a tape in accordance with a code to represent digital values from said analogue-digital converter, timing means for operating said punching means at predetermined time intervals, said analogue-digital converter comprising register-counter-like rotary mounted coding disks having ten regular side edges provided with recesses and projections representing said code, said coding disks cooperating with said punching means in such manner that the digital values of each total level values are transferred by means of mechanically operated tape punches immediately and automatically in a tape adapted to be directly given into teleprinters, computers, and the like, a guide plate for said tape to be punched, a drive shaft, and cam means arranged on the said drive shaft, said cam means being arranged to move said guide plate with said tape towards said punches and consequently to move said punches against said recesses and projections of said coding disks.

9. A device according to claim 8, comprising a plate means arranged to be moved by the cam means, a frame in which the registers and coding disks are mounted between, on the one hand, the cam means on its shaft, and the plate means, and on the other, the punches and tape guide plate, the device further comprising pull rods connecting the guide plate and the plate means.

10. A device according to claim 8 comprising a motor, arranged to be switched an and off by the timing means at preset intervals, for causing rotation of the drive shaft.

11. A device according to claim 8 comprising means driven by the drive shaft to align and lock the coding disk having the lowest denomination before tape punching takes place.

12. A device according to claim 11 in which the locking means comprises a wheel, with pointed stub teeth, connected with the lowest denomination code disk, the device further comprising a roller pawl to be forced in between the stub teeth by the drive shaft.

13. A device according to claim 8 comprising a shaft on which said coding disks are mounted, disks aligning means for aligning said disks which comprises a moving plate and spring means, the moving plate being arranged to be driven by said cam means and by the spring means so as to press against the sides of the coding disks, and means for operating said aligning means before each tape punching operation.

References Cited

UNITED STATES PATENTS

| | | | |
|---|---|---|---|
| 1,770,079 | 7/1930 | Leppla | 346—79 X |
| 2,541,426 | 2/1951 | Lammers | 346—79 X |
| 3,051,775 | 8/1962 | Novak et al. | 346—87 X |
| 3,162,044 | 12/1964 | Lee | 73—312 |
| 1,110,643 | 9/1914 | Peirce | 346—98 X |
| 2,705,105 | 3/1955 | Paschen | 346—93 X |

RICHARD B. WILKINSON, *Primary Examiner.*

JOSEPH W. HARTARY, *Assistant Examiner.*

U.S. Cl. X.R.

73—312; 346—79